Oct. 13, 1964 M. CLAPP 3,152,632
TIRE CONTOURING LATHE
Filed Oct. 16, 1961 3 Sheets-Sheet 1

INVENTOR.
MAURICE CLAPP
BY
Christie, Parker & Hale
ATTORNEYS.

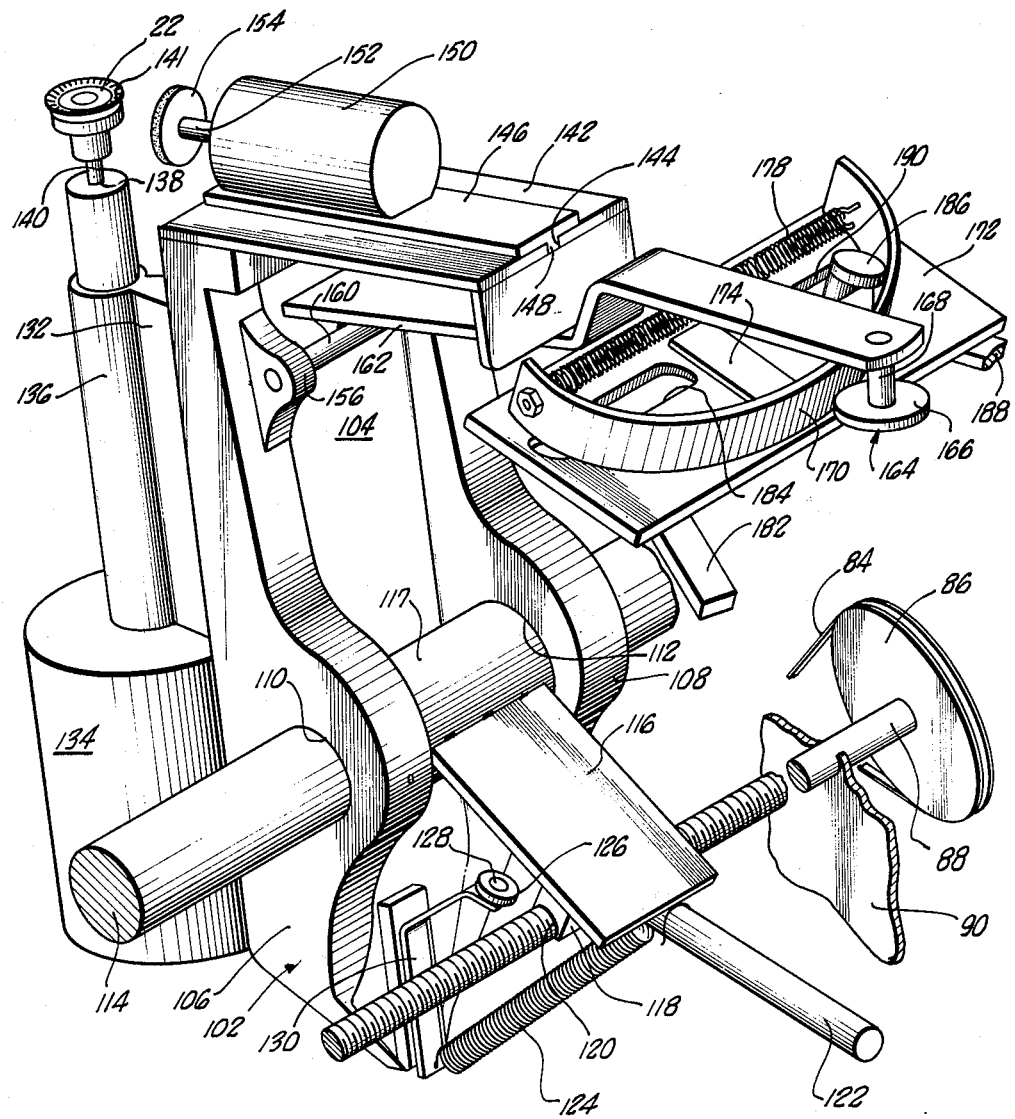

Oct. 13, 1964
M. CLAPP
3,152,632
TIRE CONTOURING LATHE
Filed Oct. 16, 1961
3 Sheets-Sheet 3
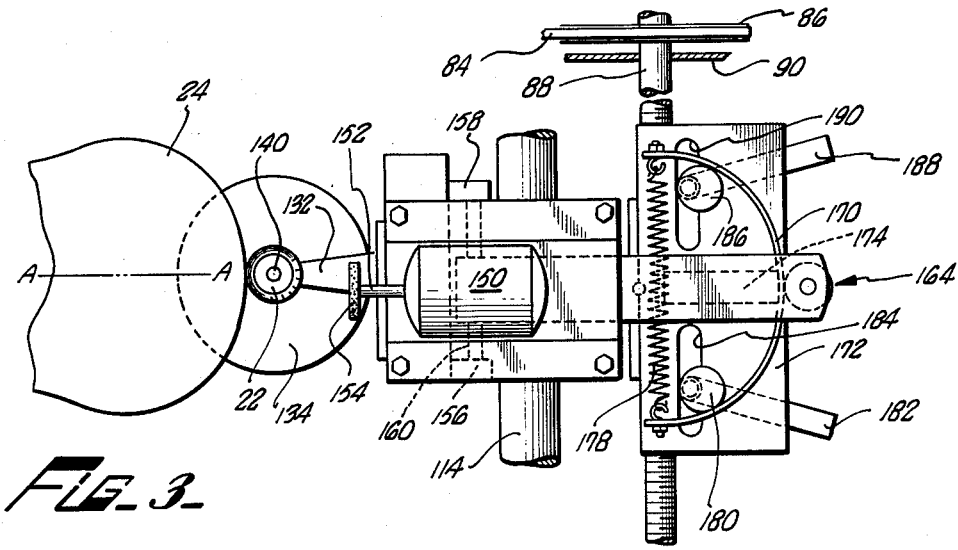
FIG_3_
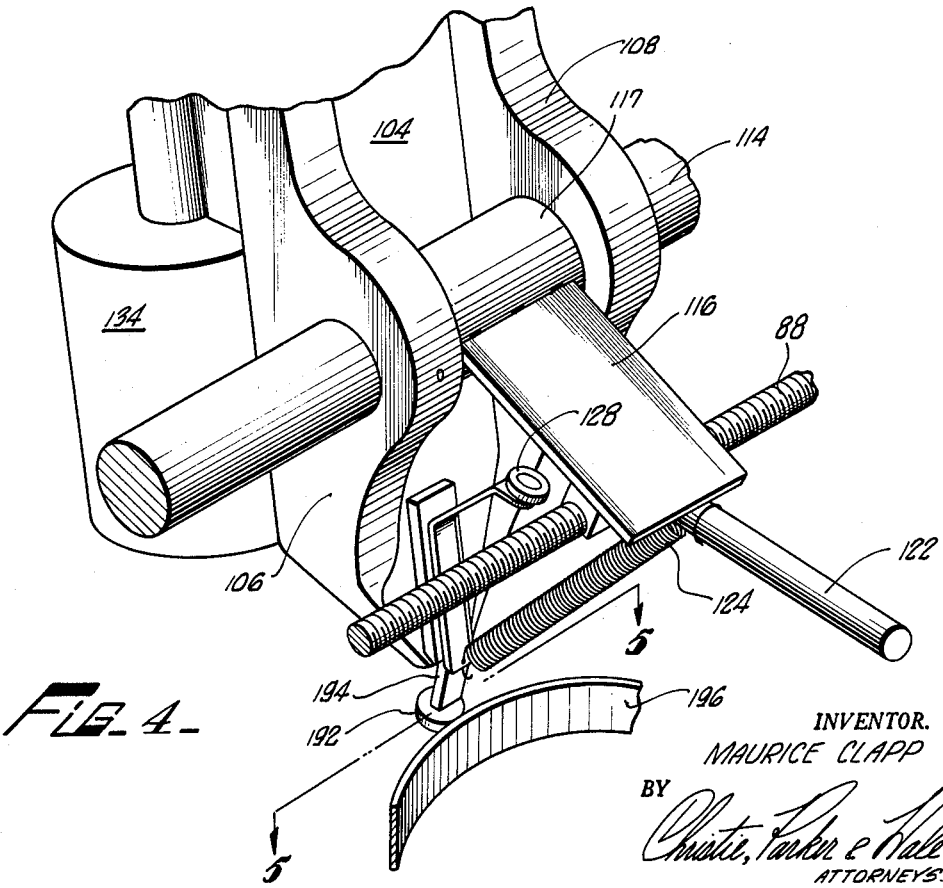
FIG_4_
INVENTOR.
MAURICE CLAPP
BY
Christie, Parker & Hale
ATTORNEYS.

United States Patent Office 3,152,632
Patented Oct. 13, 1964

3,152,632
TIRE CONTOURING LATHE
Maurice Clapp, 1703 Rossmont, Redlands, Calif.
Filed Oct. 16, 1961, Ser. No. 145,178
2 Claims. (Cl. 157—13)

This invention relates to a lathe particularly adapted for contouring worn tires preparatory to retreading or recapping of such tires.

In the preparation of worn tires for retreading, the residue of worn tread remaining on the tire must be stripped away prior to application of the recapping rubber or "camel back" to the tire carcass. The new tread is formed in the recapping rubber during the subsequent vulcanization procedure which bonds the recapping rubber to the tirer carcass.

Techniques for providing prepared tire carcasses have included use of stationary blades in cutting engagement with a rotating tire as well as the use of rotating abrading surfaces for wearing away worn tread rubber. Where stationary cutting blades are used, dulling of the cutting edges occurs during the stripping operation so that uneven and gouged surfaces are often obtained. The use of abrading surfaces not only produces a rough and coarse surface texture, but also fills the work space with a fine rubber dust that is both hazardous and unhealthful.

The tire contouring lathe of the present invention removes a predetermined outer circumferential area of a worn tire by means of a continuously rotating cutting edge. The area of rubber removed is from the tread and the side walls of the tire in accordance with a contour that has been preselected. Tires are manufactured with a definite transverse arc across the tread of the tire, the radius of the arc being different with the various tire manufacturers. Since the cutting contour of the tire contouring lathe of the present invention can be preselected, it can be used for the preparation of tires of varying sizes and diameters. Through the use of a continuously rotating cutting edge, a textured carcass surface is obtained so that adhesion of the recapping rubber to the tire carcass is promoted. The use of a rotating cutting edge enables sharpening of the edge as it cuts the worn tread rubber, thereby providing a uniform cutting action over the entire circumferential area.

The tire contouring lathe of the present invention includes means for supporting a tire having a transverse arc and means for rotating the tire. A rotatable cutting disc is supported by carrier means which is adapted to position the cutting disc in cutting engagement with the tire. Means engage the carrier means for longitudinally displacing the carrier means, and therefore the cutting disc supported by the carrier means, across the tread width of the tire. There is provided a cam which is contoured to the shape of the transverse arc of the tire. Means engage the carrier means and the cam to move the carrier means transversely along the contour of the cam simultaneously with longitudinal displacement of the carrier means. The cutting disc is thereby maintained in uniform cutting engagement with the tire.

The structure and operation of the tire contouring lathe of the present invention will be more clearly understood from the following description made in conjunction with the accompanying drawings in which:

FIG. 2 is a perspective view of the embodiment of a cutting tool assembly shown in FIG. 1;

FIG. 3 is a plan view of the embodiment of the cutting tool assembly of FIG. 2 in engagement with a tire;

FIG. 4 is a fragmentary perspective view of another embodiment of a cutting tool assembly in accordance with the present invention.

Figure 1:
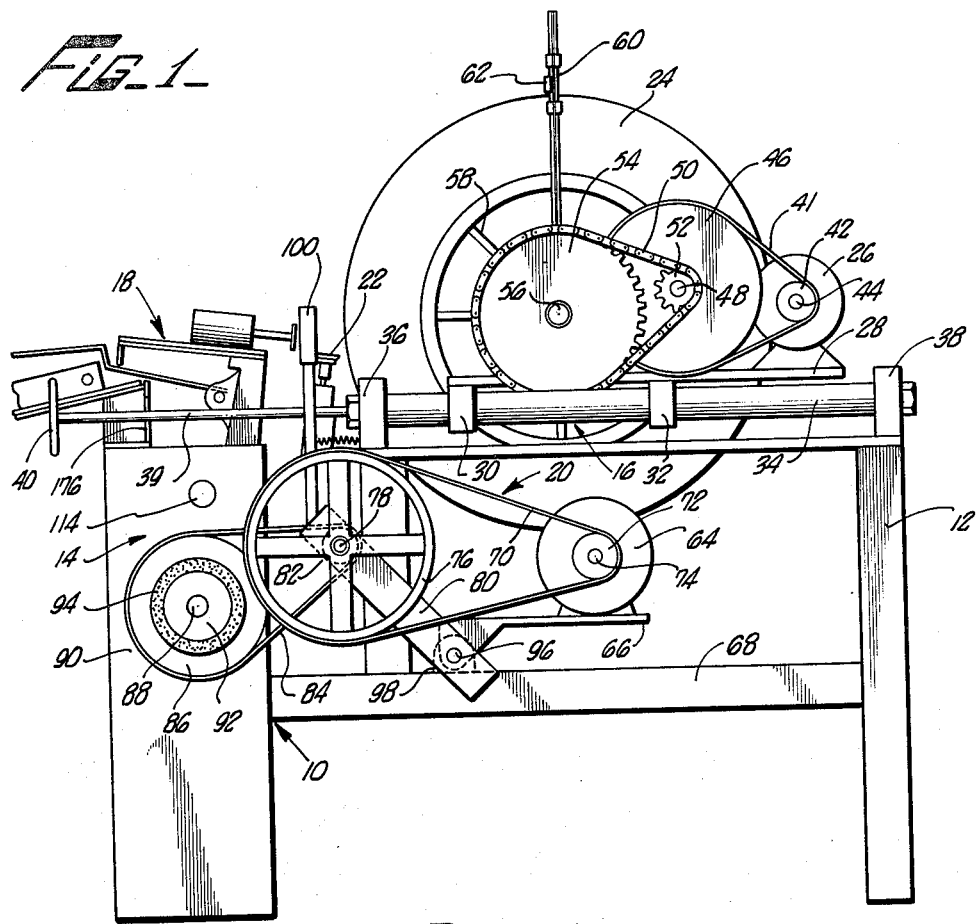
FIG. 1 is a side elevational view of one embodiment of a tire contouring lathe in accordance with the present invention.

With reference to FIG. 1, a fixed frame 10 formed in an L-shape from two table elements 12, 14 supports a tire supporting and rotating assembly 16, a cutting tool assembly 18, and a motive power assembly 20. The tire supporting and rotating assembly is mounted on top of table element 12 while the cutting tool assembly is supported on table element 14, the assemblies being positioned with respect to each other so that a cutting disc 22 of the cutting tool assembly can be aligned and placed in cutting engagement with a tire 24 supported on the tire supporting and rotating assembly.

The tire supporting and rotating assembly includes an electric motor 26 mounted on a carriage plate 28. Two transverse webs 30, 32 depend from the carriage plate at spaced points along the length of the plate. While not shown in FIG. 1, each web has a pair of transversely spaced-apart bores, each bore in one web being axially aligned with a bore in the other web. A cylindrical guide rod 34 is rigidly supported at its longitudinal ends by vertical standards 36, 38 mounted on top of table element 12. The guide rod is slidably fitted through one pair of axially aligned bores in webs 30, 32. A second cylindrical guide rod (not shown), supported in the same manner as described with reference to rod 34, is slidably fitted through the other pair of axially aligned bores in webs 30, 32. The carriage plate is therefore slidably movable along the longitudinal axis of the guide rods. A shaft 39, connected at one end to the carriage plate, extends across table element 14 and has a hand wheel 40 joined to its other end. Rotation of shaft 39 by means of the hand wheel is transferred through a conventional linkage into displacement of the carriage plate along the longitudinal axis of the guide rods.

A belt drive 41 couples a drive pulley 42 mounted on a drive shaft 44 of electric motor 26 and a driven pulley 46 mounted on a shaft 48. A chain drive 50 couples toothed gear 52 mounted on shaft 48 and toothed gear 54 mounted on one end of a tire rotating shaft 56. Tire 24 supported on a wheel 58 is mounted in a conventional fashion on the other end of tire rotating shaft 56. All of the elements of the tire supporting and rotating assembly as described are supported on carriage plate 28 and movable along the longitudinal axis of the guide rods. Through the drive mechanism as described, tire 24 is rotatable when motor 26 is energized. A measuring scale 60, supported at its base on the carriage plate, includes an adjustable pointer 62 which extends over the tire. Alignment of the pointer with the periphery of the tire provides an accurate measurement of the diameter of the tire after removal of worn tread rubber, a measurement of importance with respect to curing of a prepared tire carcass.

Motive power assembly 20 includes a reversible electric motor 64 supported on a platform 66 rigidly attached to a horizontal shelf 68 fixed in position beneath the top of table element 12. A belt drive 70 couples a drive pulley 72 mounted on a drive shaft 74 of motor 64 and a driven pulley 76. The driven pulley is mounted on one end of a shaft 78 which at its other end is journalled into an adjustable bar 80. Intermediate the ends of shaft 78 is mounted a pulley 82 which is connected by a belt 84 to drive a pulley 86 mounted on the end of a feed screw shaft 88. Feed screw shaft 88, to be described in greater detail below, is journalled through a vertical support 90 constituting one end of table element 14. A friction wheel 92, having a circumferential rubber surface 94, is mounted on the feed screw shaft exteriorly of pulley 86 to be in the same vertical plane as driven pulley 76.

Adjustable bar 80, into one end of which shaft 78 is journalled, is pivotally mounted at its other end on a pin 96 fitted into a lug 92 projecting upwardly from shelf 68. In the position of adjustable bar 80 as shown in FIG. 1, belt 84 between pulleys 82 and 86 is taut and, when electric motor 64 is energized so that pulley 72 on the shaft of the motor is driven in a counterclockwise direction, pulley 86 and therefore feed screw shaft 88 are driven in a counterclockwise direction. When adjustable bar 80 is moved by a handle 100 downwardly in a counterclockwise direction until pulley 76 is in circumferential contact with rubber surface 94 of friction wheel 92, belt 84 becomes slack, and friction wheel 92, and therefore feed screw shaft 88, are driven in the reverse direction, namely, clockwise. By the arrangement herein described, an effective system for reversing the direction of feed screw shaft 88 to provide a rapid traverse is obtained. It will be appreciated that, by the use of an idler, a rapid traverse in the same direction may also be obtained.

An embodiment of the cutting tool assembly of the present invention is particularly shown in FIGS. 2 and 3. A tool carrier 102 includes a body portion formed by a vertical plate 104 and two webs 106, 108 projecting from the opposite vertical sides of one face of the plate 104. A bore 110 in web 106 is axially aligned with a bore 112 in web 108, and a carrier rod 114, passing through the bores 110, 112, is fixed to the webs and thereby to the tool carrier. One end of carrier rod 114 is journalled through vertical support 90 of table element 14, as particularly shown in FIG. 1, and the other end is similarly journalled through the vertical support (not shown) at the other end of table element 14. The carrier rod extends exteriorly of each of the vertical supports through which it is journalled, and is mounted for both rotational and axial displacements.

A connecting plate 116 is rigidly joined to a sleeve 117 which is rotatably mounted around the portion of the carrier rod between webs 106 and 108. The connecting plate extends downwardly toward feed screw shaft 88. The feed screw shaft is journalled at one end through vertical support 90 and is adapted, as has been previously described, to be driven by the motive power assembly. It is journalled at its other end through the vertical support (not shown) at the other end of table element 14. The feed screw shaft is threaded in the portion between the vertical supports and extends parallel to the carrier rod. A block 118 having a threaded section 120 depends from connecting plate 116 so that the threaded section is in engagement with the threaded portion of the feed screw shaft. A handle 122 is joined to the connecting plate to extend outwardly from the carrier rod and feed screw shaft. A coil spring 124 is positioned between the outer edge of the connecting plate and the bottom edge of vertical plate 104 of the body of the tool carrier.

A contacting bearing 126 is rotatably mounted on a pin 128 fixed to an arm 130 secured, as by spot welding, to the lower portion of vertical plate 104 of the tool carrier. The bearing is mounted on an end of arm 130 that angularly extends from the vertical plate to place the bearing in engagement with the feed screw shaft when the inclination of the tool carrier reaches a certain position.

A vertical flange 132 is centrally attached to the other face of vertical plate 104 and supports near its bottom an electric motor 134. The flange includes a collar 136 having an elongated cylindrical bore 138 through which passes a shaft 140 coupling cutting disc 22 and motor 134. The cutting disc is a rotary cutting device in which a cutting surface 141 is provided by grinding the edge of a conventional rotary cutting device. Cutting surface 141 defines a vertical cylindrical surface, a tangential plane to said surface being parallel to the axis of shaft 140. To reduce the length of the curls of rubber cut from the tire tread during the cutting operation, it is found preferable to provide a plurality of circumferentially-spaced radial grooves (not shown) extending from cutting surface 141 inwardly toward the center of the cutting disc.

A supporting plate 142 is attached near one end to the top of vertical plate 104 and webs 106, 108 to extend horizontally in the direction of the webs. A longitudinal central groove 144 is formed in the supporting plate. A slide bar 146 having a tongue 148 fitted within groove 144 rests on top of the horizontal plate. The slide bar provides the mounting for an electric motor 150 having a shaft 152 and an abrasive disc 154 fitted to the end of shaft 152. The shaft of motor 150 extends toward the cutting disc, the motor being positioned with respect to the cutting disc so that a slidable movement of slide bar 146 within groove 144 brings the abrasive disc against the cutting edge of the cutting disc for sharpening of the cutting edge during rotation of the disc.

A pair of brackets 156, 158 extending from webs 106, 108, respectively, beneath supporting plate 142, rigidly support a connecting rod 160. One end of a cam bar 162 is secured to the connecting rod. A cam follower 164, comprising a disc 166 rotatably mounted on a pin 168, depends from the other end of cam bar 162.

The cam follower is associated with a cam 170 secured to a cam bed 172 by a bracket 174. As particularly shown in FIG. 1, the cam bed is elevated from the top of table element 14 and is supported by a vertical mounting 176. Cam 170 is a flexible metallic band having an arcuate shape opening toward the tool carrier. The terminal ends of the arcuate cam are urged toward each other by a coil spring 178. Adjustment of the arcuate shape of cam 170 to the transverse arc of the tire is made by means of a washer 180, secured to a handle 182 and associated with a slot 184 in the cam bed 172, and a washer 186 secured to a handle 188 and associated with a slot 190 in cam bed 172. Slot 184 is positioned near one end of cam 170. Washer 180 rests on the upper surface of the cam bed with its connection to handle 182 passing through the slot. Slot 190 is positioned near the other end of cam 170. Washer 186 rests on the upper surface of the cam bed with its connection to handle 188 passing through the slot. Adjustment of the position of a washer along the length of the slot with which it is associated changes the arcuate shape of the cam, since the force of spring 178 urges each end of the cam to a position abutting a respective washer.

Cam follower 164 follows the contour of the cam along its exterior surface. Disc 166 of cam follower 164 has a diameter equal to the diameter of cutting disc 22, the centers of the two discs lying within the vertical plane normal to the surfaces of the discs.

The operation of the tire contouring lathe of the present invention will now be described with particular reference to FIG. 3. Hand wheel 40 is rotated to bring carriage plate 28 together with tire 24 toward cutting disc 22. Carrier rod 114 is longitudinally displaced by rotation of feed screw shaft 88 until the cutting disc is initially positioned on the center line A—A passing through the crown of the transverse arc of the tire. The position of motor 134 on the tool carrier causes its weight to produce a turning moment to the tool carrier so that the weight of the motor holds the cutting disc in cutting engagement against the tire. It has been found preferable to rotate the cutting disc so that its direction of rotation during cutting is toward the outer edge of the tire. A movement of the cutting disc downwardly as viewed in FIG. 3 requires, therefore, a clockwise rotation of the cutting disc.

Motive power assembly 20 previously described is energized so that pulley 86 drives feed screw shaft 88 to produce a longitudinal displacement of the carrier rod and the tool carrier mounted thereon downwardly as viewed in FIG. 3. Cam follower 164 follows along cam 170, previously adjusted to conform to the contour of the tire, thereby causing cutting disc 22, continuously rotating in cutting engagement with the tire, to follow the transverse arc of the tire. The longitudinal displacement of the tool carrier is curvilinear while the cam follower follows cam 170. The tension in spring 124 varies as the cam follower follows cam 170 so as to add to the weight of motor 134 and maintain uniform cutting engagement between the cutting disc and the tire. Tread rubber and a predetermined portion of the sidewall rubber are thereby stripped away from the tire. When the cam follower reaches the end of the cam, the tool carrier is inclined in a position in which contacting bearing 126 engages the feed screw shaft and thereby prevents further inclination of the tool carrier. In this position, further rotation of the feed screw shaft produces a linear longitudinal movement of the tool carrier.

To prepare the other half of the tire in the same manner, the rapid traverse of the motive power assembly is actuated so as to restore the tool carrier and cutting disc to the position shown in FIG. 3. The polarity of electric motor 134 is reversed to produce a counterclockwise rotation of the cutting disc. The polarity of the electrical motor of motive power assembly 20 is reversed so that feed screw shaft 88 is driven to produce a longitudinal displacement of the tool carrier upwardly as viewed in FIG. 3. Stripping away of tread rubber and a predetermined portion of sidewall rubber occurs in the same manner as already described.

The cutting operation heretofore described results in a uniform removal of worn tread rubber in curls without production of rubber dust particles. The cutting action of the rotating disc is such that the necessity for subsequent buffing of the tire carcass is frequently eliminated. As the cutting operation proceeds in the manner described, sharpening of the cutting edge of cutting disc 22 can be accomplished simply by slidable movement of slide bar 146 so as to engage abrasive disc 154 with the rotating cutting edge of the cutting disc.

Figure 5:
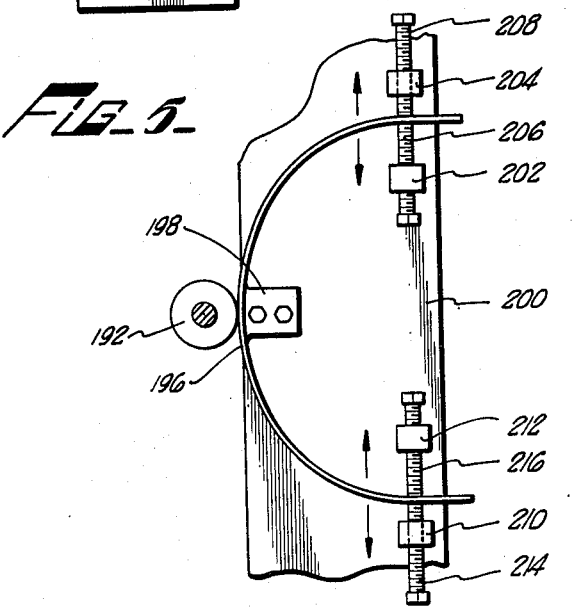
FIG. 5 is a plan view generally taken along line 5—5 of FIG. 4.

With particular reference to FIGS. 4 and 5, another embodiment of the tool carrier in accordance with the present invention is shown. The same reference characters used with respect to FIGS. 1 through 3 are used to identify elements in FIGS. 4 and 5 identical to those in FIGS. 1 through 3. The embodiment of the tool carrier shown in FIGS. 4 and 5 is identical to the tool carrier particularly described with reference to FIGS. 1 through 3 except that a cam follower 192 is mounted on a cam bar 194 angularly depending from the bottom of vertical plate 104 of the body of the tool carrier. The cam follower is associated with a cam 196 secured by a bracket 198 to a cam bed 200. Cam 196 is a flexible metallic band formed in an arcuate shape opening away from the tire and the cutting disc. The contour of cam 196 can be adjusted to the transverse arc of the tire. At one end of the cam, nuts 202, 204 are rigidly fastened to cam bed 200 on opposite sides of the cam. Bolts 206, 208 are threaded through nuts 202, 204 respectively so that the ends of the bolts abut the cam at opposed points on opposite surfaces of the cam. Adjustment of the length of each bolt threaded through the nut with which it is associated moves the end of the cam and thereby changes the radius of curvature and contour of the portion of the cam between bracket 198 and the opposed points contacted by the bolts. At the other end of the cam, nuts 210, 212 are rigidly fastened to the cam bed on opposite sides of the cam. Bolts 214, 216 are threaded through nuts 210, 212 respectively and are adjustable in the manner described with reference to bolts 206, 208 to change the shape of the portion of the cam between bracket 198 and the opposed points on the cam contacted by bolts 210, 212.

The embodiment of the tool carrier shown in FIGS. 4 and 5 is associated with a tire supporting and rotating assembly and a motive power assembly in the same manner as described with reference to FIG. 1. A cutting disc (not shown) is mounted on the tool carrier in the same manner as described with reference to FIGS. 1 through 3. The cutting disc and the disc of cam follower 192 are the same in diameter, the centers of the two discs lying within the vertical plane normal to the surfaces of the discs.

In operation, a tire contouring lathe having the embodiment of the tool carrier shown in FIGS. 4 and 5 functions in the same manner as has been described with reference to FIGS. 1 through 3. Upon rotation of feed screw shaft 88, cam follower 192 follows the exterior contour of cam 196 to cause the cutting disc on the tool carrier to follow the transverse arc of the tire in cutting engagement. When cam follower 192 reaches points along the exterior contour ahead of the points where either bolt 208 or bolt 214 contacts the cam, contacting bearing 126 engages the feed screw shaft to produce a linear longitudinal displacement of the tool carrier.

It will be understood that the specific embodiments of the tire contouring lathe of the present invention described heretofore, while illustrating the principle of the present invention, may be modified and adapted within the scope and principle of the present invention.

I claim:

1. A tire contouring lathe comprising means for supporting a tire having a transverse arc, means for rotating the tire, a carrier rod mounted for rotational and axial displacements, a tool carrier non-rotatably secured to the carrier rod, the tool carrier being weighted to produce a gravitational rotary turning moment of the carrier and the carrier rod in the direction of the tire, a rotatable disc positioned on the tool carrier for cutting engagement with the tire, a feed screw, a source of motive power coupled to the feed screw for rotation of the feed screw, means engaging the carrier rod and the feed screw to produce axial displacement of the carrier rod responsive to rotation of the feed screw, an arcuate cam contoured to the shape of the transverse arc of the tire, means for varying the arcuate shape of the cam, a bar connected at one end to the tool carrier, a cam follower joined to the other end of the bar, the cam follower being positioned on the bar to move along the contour of the cam and to produce by a rotary turning moment opposite to the gravitational turning moment of the tool carrier a curvilinear displacement of the tool carrier simultaneously with axial displacement of the carrier rod, and means joined to the tool carrier for engaging the feed screw to stop turning of the tool carrier and carrier rod when the cam follower is moved to the end of the cam, thereby limiting further movement of the tool carrier to linear axial displacement.

2. A tire contouring lathe comprising a frame, means for supporting a tire having a transverse arc, means for rotating the tire, a carrier rod mounted for rotational and axial displacements, a tool carrier non-rotatably secured to the carrier rod, the tool carrier being weighted to produce a gravitational rotary turning moment of the carrier and the carrier rod in the direction of the tire, a rotatable cutting disc positioned on the tool carrier for cutting engagement with the tire, a feed screw, drivable means mounted on the feed screw, a friction wheel mounted on the feed screw, adjustable means mounted at one end to the frame on a pivotal connection, a shaft journaled in said adjustable means, first and second rotatable means mounted on said shaft, said first rotatable means being aligned with the friction wheel to enable peripheral engagement therewith, a source of motive power, means coupling the source of motive power and the first rotatable means, drive means coupling the second rotatable means and the drivable means for rotation of the feed screw, means for moving the adjustable means to a first position in which the drive means is taut so as to rotate the feed screw in one direction and to a second position in which the drive means is slack and the first rotatable means peripherally engages the friction wheel to rotate the feed screw in an opposite direction, means engaging the carrier rod and the feed screw to produce axial displacement of the carrier rod responsive to rotation of the feed screw, an arcuate cam contoured to the shape of the transverse arc of the tire, and means engaging the tool carrier and the cam to produce by a rotary turning moment opposite to the gravitational turning moment of the tool carrier a curvilinear displacement of the tool carrier simultaneously with axial displacement of the carrier rod and the tool carrier supported thereon.

References Cited in the file of this patent

UNITED STATES PATENTS

| | | |
|---|---|---|
| 1,891,789 | Wheeler | Dec. 20, 1932 |
| 2,601,810 | James | July 1, 1952 |
| 2,893,479 | Sheridan et al. | July 7, 1959 |
| 2,925,125 | Curry | Feb. 16, 1960 |
| 2,941,584 | Glynn | June 21, 1960 |
| 2,986,205 | Okerstrom | May 30, 1961 |